(12) United States Patent
Chang et al.

(10) Patent No.: US 7,702,880 B2
(45) Date of Patent: Apr. 20, 2010

(54) HYBRID MAPPING IMPLEMENTATION WITHIN A NON-VOLATILE MEMORY SYSTEM

(75) Inventors: Robert C. Chang, Danville, CA (US); Bahman Qawami, San Jose, CA (US); Farshid Sabet-Sharghi, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 297 days.

(21) Appl. No.: 11/617,441

(22) Filed: Dec. 28, 2006

(65) Prior Publication Data

US 2007/0150694 A1 Jun. 28, 2007

Related U.S. Application Data

(62) Division of application No. 10/676,652, filed on Oct. 1, 2003, now Pat. No. 7,188,228.

(51) Int. Cl.
*G06F 12/00* (2006.01)

(52) U.S. Cl. .................. 711/202; 711/5; 711/103; 711/171; 707/205; 703/23; 365/51

(58) Field of Classification Search ................. 711/202
See application file for complete search history.

(56) References Cited

U.S. PATENT DOCUMENTS

| | | |
|---|---|---|
| 5,095,420 A | 3/1992 | Eilert et al. |
| 5,113,512 A | 5/1992 | Miki et al. |
| 5,222,109 A | 6/1993 | Pricer |
| 5,297,148 A | 3/1994 | Harari et al. |
| 5,341,339 A | 8/1994 | Wells |
| 5,375,214 A | 12/1994 | Mirza et al. |
| 5,388,083 A | 2/1995 | Assar et al. |
| 5,404,485 A | 4/1995 | Ban |
| 5,438,573 A | 8/1995 | Mangan et al. |
| 5,561,778 A | 10/1996 | Fecteau et al. |
| 5,568,439 A | 10/1996 | Harari |

(Continued)

FOREIGN PATENT DOCUMENTS

JP           62-283496           12/1987

(Continued)

OTHER PUBLICATIONS

Kim et al., "A Space-Efficient Flash Translation Layer for Compactflash Systems," Trans. Cons. Elec., vol. 48, No. 2 (IEEE, May 2002).

(Continued)

*Primary Examiner*—Hetul Patel
(74) *Attorney, Agent, or Firm*—Brinks Hofer Gilson & Lione

(57) ABSTRACT

Methods and apparatus for allowing different mapping implementations, including a many-to-one logical to physical block mapping, to be used within a memory system are disclosed. According to one aspect of the present invention, a method for mapping a plurality of logical blocks to a physical block includes identifying a first logical block meets at least one criterion. The method also includes identifying a second logical block which is substantially complementary to the first logical block, and providing contents associated with the first logical block and contents associated with the second logical block to the physical block.

22 Claims, 7 Drawing Sheets

U.S. PATENT DOCUMENTS

| | | | |
|---|---|---|---|
| 5,579,499 | A | 11/1996 | Fecteau et al. |
| 5,594,881 | A | 1/1997 | Fecteau et al. |
| 5,598,370 | A | 1/1997 | Niijima et al. |
| 5,734,816 | A | 3/1998 | Niijima et al. |
| 5,835,935 | A | 11/1998 | Estakhri et al. |
| 5,845,313 | A | 12/1998 | Estakhri et al. |
| 5,860,082 | A | 1/1999 | Smith et al. |
| 5,907,856 | A | 5/1999 | Estakhri et al. |
| 5,924,113 | A | 7/1999 | Estakhri et al. |
| 5,930,193 | A | 7/1999 | Achiwa et al. |
| 5,937,425 | A | 8/1999 | Ban |
| 5,987,573 | A | 11/1999 | Hiraka |
| 6,016,275 | A | 1/2000 | Han |
| 6,081,447 | A | 6/2000 | Lofgren et al. |
| 6,115,785 | A | 9/2000 | Estakhri et al. |
| 6,125,435 | A | 9/2000 | Estakhri et al. |
| 6,139,177 | A | 10/2000 | Venkatraman et al. |
| 6,230,233 | B1 | 5/2001 | Lofgren et al. |
| 6,260,156 | B1 | 7/2001 | Garvin et al. |
| 6,381,176 | B1 | 4/2002 | Kim et al. |
| 6,405,295 | B1 | 6/2002 | Bando |
| 6,426,893 | B1 | 7/2002 | Conley et al. |
| 6,505,293 | B1 * | 1/2003 | Jourdan et al. .............. 712/217 |
| 6,625,723 | B1 * | 9/2003 | Jourday et al. .............. 712/217 |
| 6,684,289 | B1 | 1/2004 | Gonzalez et al. |
| 6,772,274 | B1 | 8/2004 | Estakhri |
| 6,807,095 | B2 | 10/2004 | Chen et al. |
| 6,823,526 | B2 | 11/2004 | Howard et al. |
| 7,188,228 | B1 | 3/2007 | Chang et al. |
| 2001/0010065 | A1 | 7/2001 | Chiba |
| 2002/0099904 | A1 | 7/2002 | Conley |
| 2005/0246480 | A1 | 11/2005 | Fu |

FOREIGN PATENT DOCUMENTS

| | | |
|---|---|---|
| JP | 62-283497 | 12/1987 |
| WO | 02/058074 A2 | 7/2002 |

OTHER PUBLICATIONS

Chiang et al., "Managing Flash Memory in Personal Communication Devices", Proc. Int'l Symp. Consumer Elec. (IEEE, 1997), pp. 177-182.

Kawaguchi et al., "Flash-Memory Based File System", Proc. USENIX Tech. Conf. (1995), pp. 155-164.

* cited by examiner

HYBRID MAPPING IMPLEMENTATION WITHIN A NON-VOLATILE MEMORY SYSTEM

CROSS REFERENCE TO RELATED APPLICATIONS

The present invention is related to co-pending U.S. patent application Ser. Nos. 10/281,739, 10/281,823, 10/281,670, 10/281,824, 10/281,631, 10/281,855, 10/281,762, 10/281,696, 10/281,626, and 10/281,804, as well as co-pending U.S. Provisional Patent Application Nos. 60/421,910, 60/421,725, 60/421,965, 60/422,166, 60/421,746, and 60/421,911, each filed on Oct. 28, 2002, which are each incorporated herein by reference in their entireties.

BACKGROUND OF THE INVENTION

1. Field of Invention

The present invention relates generally to mass digital data storage systems. More particularly, the present invention relates to systems and methods for efficiently utilizing memory by enabling different types of mapping to be used within the memory.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

Since resources such as the amount of available memory space in a flash memory storage system are often limited, the efficient usage of memory within the system is critical. By way of example, within flash memory storage systems, pools of spare physical blocks, or physical blocks which are currently not in use but are available for use, may eventually run low. In other words, the number of physical blocks in a spare block pool may be less than a typically desired amount. When the number of spare physical blocks is relatively low, the performance of the overall system may be compromised. When the growing defects consume all spare blocks, the system, e.g., flash memory card, will not function if a spare block is needed. As such, in order for the card to be used, it may be necessary to format the card into a lower capacity.

Therefore, what is desired is a process and a system which allows memory resources within a flash memory system to be efficiently used. Specifically, what is needed is a process and a system which allows for alternative types of logical to physical block mappings to be used in order to efficiently use memory resources and enable physical blocks to be reclaimed for use in a spare block pool when needed.

SUMMARY OF THE INVENTION

The present invention relates to a system and a method that allow different mapping implementations, including a many-to-one logical to physical block mapping, to be used within a memory system. According to one aspect of the present invention, a method for mapping a plurality of logical blocks to a physical block includes identifying a first logical block meets at least one criterion. The method also includes identifying a second logical block which is substantially complementary to the first logical block, and providing contents associated with the first logical block and contents associated with the second logical block to the physical block.

In one embodiment, identifying the first logical block which meets at least one criterion includes determining if the physical block has a relatively low erase count. In such an embodiment, identifying the first logical block which meets at least one criterion further includes determining when the contents associated with the first logical block are associated with less than a first predetermined number of groups associated with the first logical block.

A memory system which allows mappings between logical and physical blocks to be varied enables physical blocks to be used in an efficient manner. In particular, the ability for the system to allow for more than one logical block to be mapped to a single physical block, e.g., in a many-to-one mapping, enables physical blocks to be conserved. For example, if physical blocks previously associated with logical blocks which have been mapped using a many-to-one mapping are reclaimed for use in a spare block pool when the number of available blocks in the spare block pool is considered to be low, the use of physical blocks is conserved. As such, the life of the system may be prolonged, and the performance of the system may be maintained at an acceptable level.

According to another aspect of the present invention, a method for associating a first logical block with at least a first physical block includes determining when the first physical block is associated with a second logical block, and determining when it is appropriate to map the first logical block to the first physical block if it is determined that the first physical block is associated with the second logical block. The method also includes mapping the first logical block to the first physical block when it is determined that it is appropriate to map the first logical block to the first physical block.

In one embodiment, when the first physical block is not associated with the second logical block the first logical block to the first physical block. In such an embodiment, the method may also include determining when it is appropriate to map a third logical block to the first physical block, and mapping the third logical block to the first physical block when appropriate.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation a memory device, e.g., memory device 120 of FIG. 1a.

DETAILED DESCRIPTION OF THE EMBODIMENTS

Within a non-volatile memory system, the efficient allocation of resources is critical to ensure that the performance of the system meets or exceeds acceptable standards. A system which allows mappings between logical and physical blocks to be varied enables physical blocks to be used in an efficient manner. When a system allows a single logical block to be mapped to more than one physical block, e.g., in a one-to-many or a partial-to-one mapping, a portions of the logical block may be mapped to different physical blocks, which may be particularly efficient when part of the logical block is constantly updated while another part is not. The use of separate physical blocks allows the physical block corresponding to the constantly updated portion of the logical block to be rewritten without requiring all data associated with the logical block to be constantly rewritten. If the system also allows more than one logical block to be mapped to a single physical block, e.g., in a many-to-one mapping, physical blocks may effectively be conserved when desired. For example, the ability to map more than one logical block to a single physical block enables extra physical blocks to be reclaimed for use in a spare block pool when the number of available blocks in the spare block pool is considered to be low. In general, by allowing different mapping schemes to be used substantially simultaneously within a system, the likelihood that a system is used to its full potential may be increased.

Figure 1A:
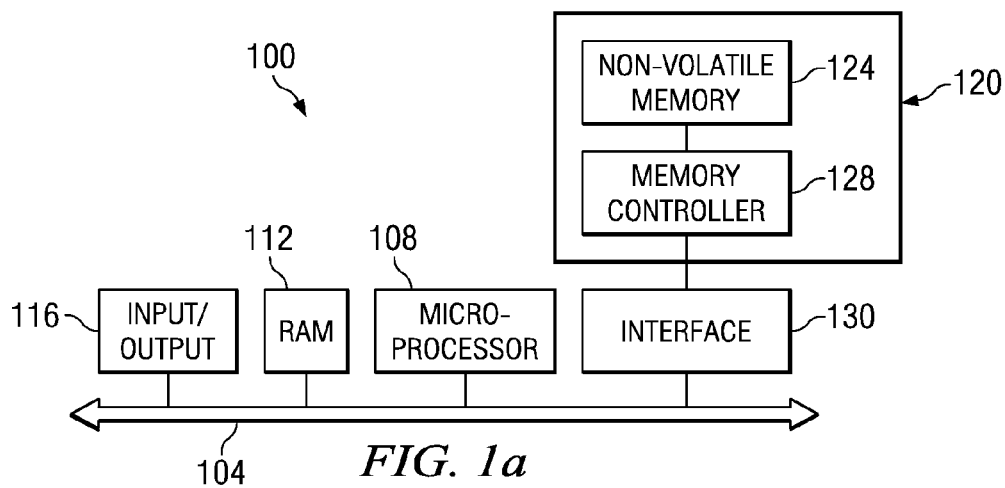
FIG. 1a is a diagrammatic representation of a general host system which includes a non-volatile memory.

Flash memory systems or, more generally, non-volatile memory devices which may benefit from a hybrid mapping implementation generally include flash memory cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 1c. Referring to FIG. 1a, a general host system which includes a non-volatile memory device, e.g., a CompactFlash memory card or substantially any type of memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 1b.

Non-volatile memory 124, e.g., flash memory such as NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 1B:
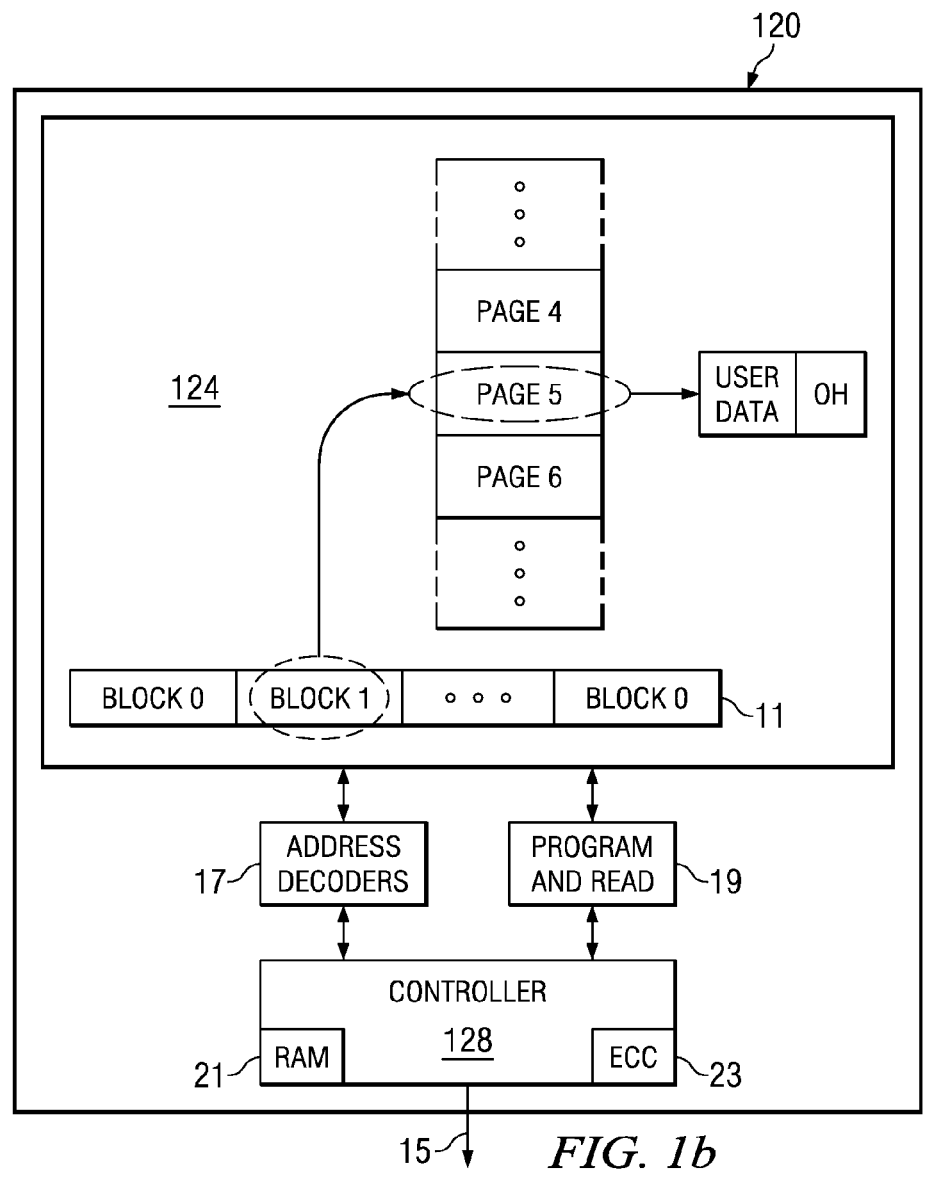

With reference to FIG. 1b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 1a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0-N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 1b, one sector includes user data and overhead data. Overhead data typically includes an error correction code (ECC) that has been calculated from the user data of the sector. A portion 23 of the control system 128 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, or redundant data, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

In one embodiment, non-volatile memory is embedded into a system, e.g., a host system. Flash memory chip sets generally include flash memory components and a controller component. Typically, a flash memory chip set may be arranged to be assembled into an embedded system. The manufacturers of such assemblies or host systems typically acquire flash memory in component-form, as well as other components, then assemble the flash memory and the other components into a host system.

Figure 1C:
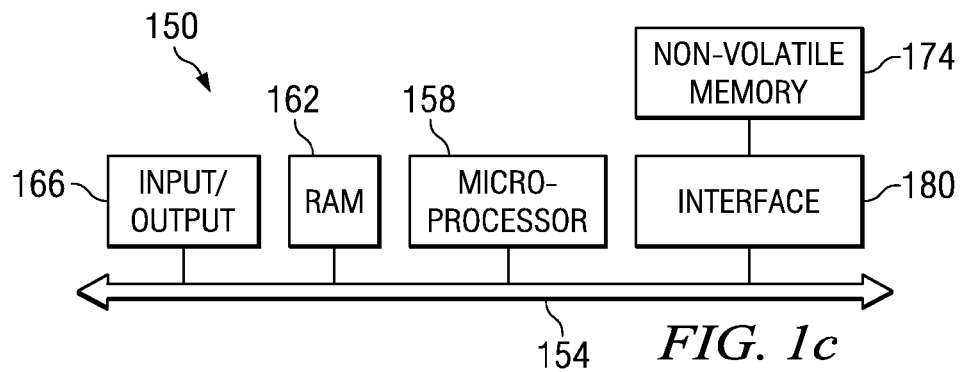
FIG. 1c is a diagrammatic representation of a host system which includes an embedded non-volatile memory.

FIG. 1c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside non-volatile memory 174, which will be described below, may enable physical blocks in non-volatile memory 174 to be addressed, and may enable information to be stored into, read from, and erased from the physical blocks.

In general, a non-volatile memory component such as a NAND flash memory chip is divided into blocks which contain pages. The pages may be grouped into a plurality of groups such that each logical block may include multiple groups of logical pages and each physical block may include multiple groups of physical pages. A system which uses groups of pages is particularly suitable for a hybrid mapping implementation which supports a one-to-one logical to physical block mapping, a one-to-many logical to physical block mapping, and a many-to-one logical to physical block mapping.

Figure 2:
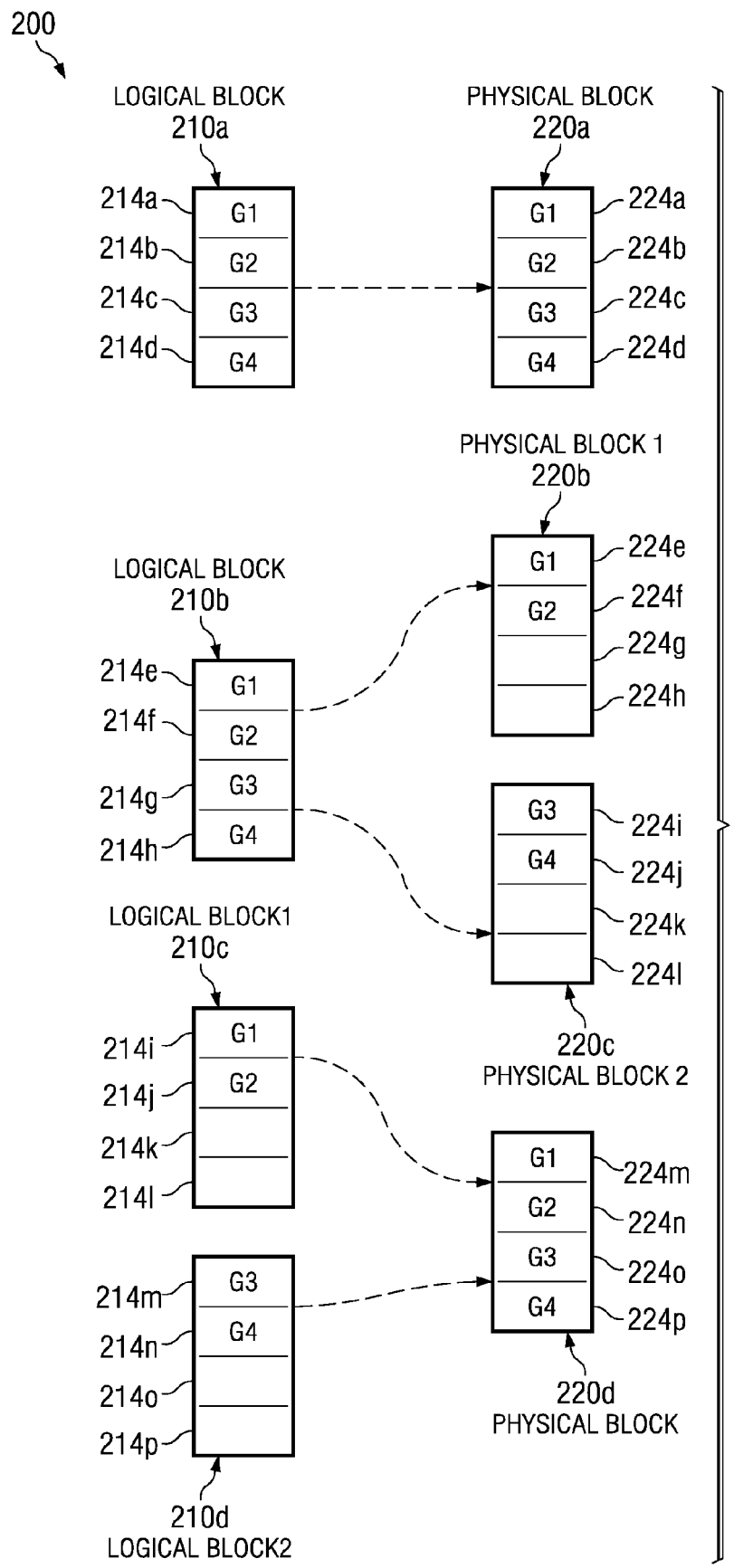
FIG. 2 is a block diagram representation of different mapping schemes between logical and physical blocks within a system in accordance with an embodiment of the present invention.

With reference to FIG. 2, a hybrid mapping implementation will be described in accordance with an embodiment of the present invention. A non-volatile memory system 200 includes logical blocks 210 and physical blocks 220. Logical blocks 210 include groups 214 of logical pages (not shown) and physical blocks 220 include groups 224 of physical pages (not shown). In order to allow for system 200 to operate efficiently with a relatively high level of performance, a hybrid mapping scheme may be utilized such that physical blocks 220 are allocated efficiently.

A logical block 210a, which includes groups 214a-d, may be mapped to a physical block 220a such that contents corresponding to groups 214a-d are stored in groups 224a-d, respectively. However, when it is more efficient for a single logical block 210 to be mapped to more than one physical block 220, a logical block such as logical block 210b which includes logical groups 214e-h may be mapped to physical blocks 220b, 220c. When logical block 210b is mapped to physical blocks 220b, 220c, some groups 214e-h are mapped to pages 224e-h in physical block 220b while some groups 214e-h are mapped to pages 224i-l in physical block 220c. As shown, contents associated with groups 214e, 214f are stored in groups 224e, 224f of physical block 220b, while contents associated with groups 214g, 214h are stored in groups 224i, 224j of physical block 220c.

In some instances, it may be efficient for a plurality of logical blocks 210, as for example logical block 210c and logical block 210d, to be mapped to a shared, single physical block 220d. For instance, when there is a shortage of available physical blocks, allowing logical blocks 210c, 210d to share physical block 220d generally allows at least one additional physical block to become available. As will be appreciated by those skilled in the art, the ability to obtain additional physical blocks when there is a shortage of available physical blocks, e.g., in a spare block pool, may enable the life of a system such as system 200 to be extended.

When logical blocks 210c, 210d share physical block 220d, substantially any groups 214i-l within logical block 210c which have associated contents and substantially any groups 214m-p within logical block 210d which have associated contents are mapped to groups 224m-p within physical block 220d. As shown, groups 214i, 214j of logical block 210c have associated contents, and groups 214m, 214n of logical block 210d have associated contents. Contents associated with groups 214i, 214j are stored in groups 224m, 224n, while contents associated with groups 214m, 214n are stored in groups 224o, 224p.

As previously mentioned, within a system which supports a hybrid mapping scheme, two or more logical blocks may be mapped to a single physical block such that the logical blocks effectively share the physical block. When a plurality of logical blocks are mapped to a shared physical block, it should be appreciated that the number of groups, i.e., groups of pages, from each logical block which are mapped into the shared physical block may vary. In one embodiment, when approximately fewer than half of all groups associated with a logical block contain data, that logical block is generally a candidate for sharing a physical block, irregardless of the location of the groups within the logical block which contain data.

The ability for more than one logical block to share a single physical block is generally useful in prolonging the life of a memory system. Because there are relatively few physical blocks with a low erase count, and there are more physical blocks available for use, the erase count of each physical block will be lower overall when more than one logical block shares a single physical block. Thus, the life of the memory system may be extended. Further, a pool of available physical blocks is increased when more than one logical block may share a single physical block, thereby reducing the likelihood that substantially all spare blocks may be consumed by growing defects. Although a hybrid implementation which provides the capability to map more than one logical block to a single physical block is useful for substantially all memory system, such an implementation is particularly useful when a memory system has a relatively short lifetime, e.g., a lifetime of approximately ten thousand cycles.

Figure 3A:
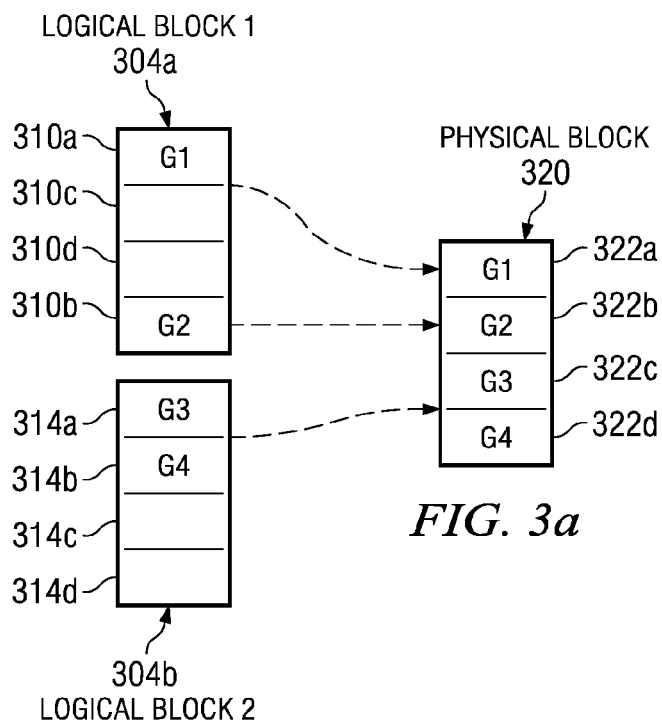
FIG. 3a is a block diagram representation of a mapping of two logical blocks to a single physical block in accordance with an embodiment of the present invention.

With reference to FIG. 3a, a two-to-one logical to physical block mapping will be described in accordance with an embodiment of the present invention. A plurality of logical blocks 304 are complementary logical blocks in that logical block 304a and logical block 304b are suitable for sharing a single physical block 320. Logical groups 310 within logical block 304a are such that substantially only groups 310a, 310b contain data. Typically, when even only one page (not shown) within a group 310 contains data, then the overall group 310 is considered as containing data. Similarly, logical groups 314 within logical block 304b are such that substantially only groups 314a, 314b contain data.

Although the threshold for determining whether a logical block 304, as for example either logical block 304a or logical block 304b, may be suitable for sharing physical block 320 may vary, the threshold is often such that a logical block 304 with data in no more than approximately half of its groups is considered suitable for sharing physical block 320. Since logical block 304a has a total of four groups 310 and only two groups 310a, 310b contain data, while logical block 304b has a total of four groups 314 and only two groups 314a, 314b contain data, logical block 304a and logical block 304b are suitable for sharing physical block 320, which is effectively divided into physical groups 322. As shown, contents associated with group 310a are stored into group 322a, contents associated with group 310b are stored into group 322b, contents associated with group 314a are stored into group 322c, and contents associated with group 314b are stored into group 322d.

Allowing two logical blocks 304 to be mapped to a single physical block 320 reduces the number of physical blocks 320 which are used by an overall system. Hence, when a spare block pool is running low and additional physical blocks are desired for the spare block pool, mapping two logical blocks 304 to physical block 320 allows the number of physical blocks in use to be reduced by one. Reducing the number of physical blocks in use generally enables the number of available, or spare, blocks to be increased.

Figure 3B:
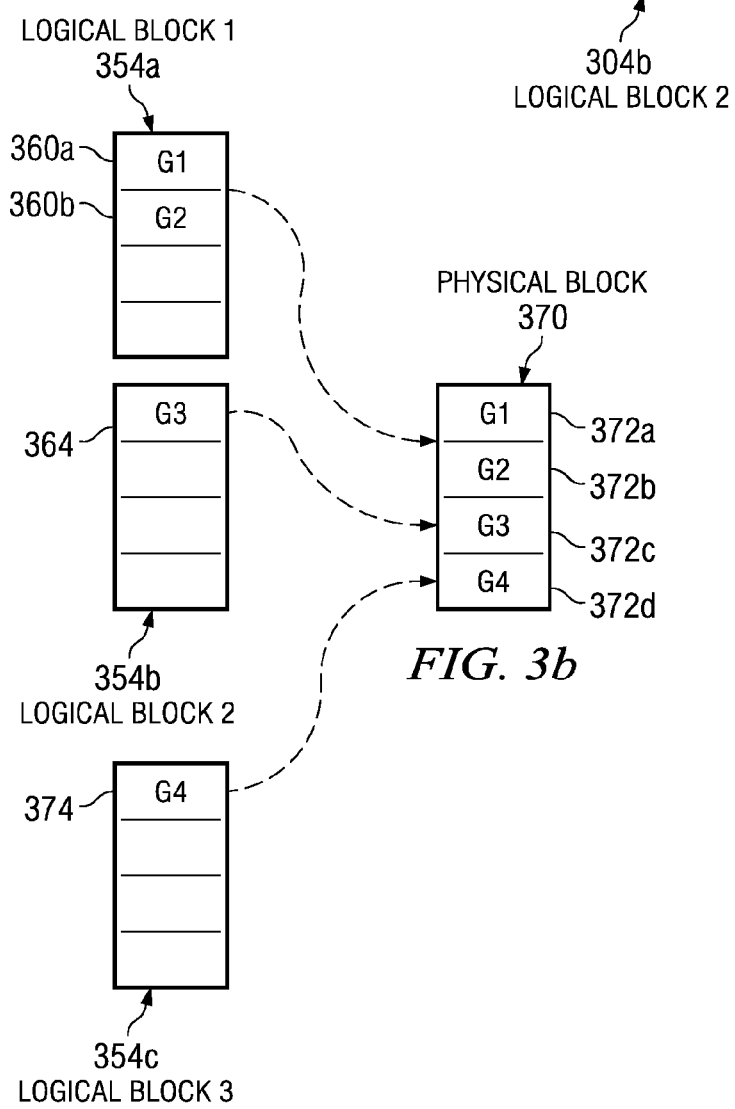
FIG. 3b is a block diagram representation of a mapping of multiple logical blocks to a single physical block in accordance with an embodiment of the present invention.

In many instances, more than two logical blocks may be mapped to a single physical block. FIG. 3b is a block diagram representation of a mapping of multiple logical blocks to a single physical block in accordance with an embodiment of the present invention. When multiple logical blocks 354 are complementary, logical blocks 354 may all be mapped to a shared physical block 370. Logical blocks 354 may be considered to be complementary when the number of logical groups which contain data within logical blocks 354 does not exceed the total number of logical groups in any single logical block 354. For example, logical block 354a includes two groups 360a, 360b which effectively contain data, logical block 354b includes one group 364 which effectively contains data, and logical block 354c includes one group 374 which effectively contains data. Hence, since each logical block 354, as shown, includes four groups and the number of groups 360a, 360b, 364, 374 which effectively contain data is four, logical blocks 354 may be considered to be suitable for sharing physical block 370.

Since logical blocks 354 are such that the contents or data associated with logical blocks 354 may be stored in physical block 370, the contents are stored in physical groups 372 of physical block 370. Specifically, contents associated with group 360a are stored in group 372a, contents associated with group 360b are stored in group 372b, contents associated with group 364 are stored in group 372c, and contents associated with group 374 are stored in group 372d.

Figure 4A:
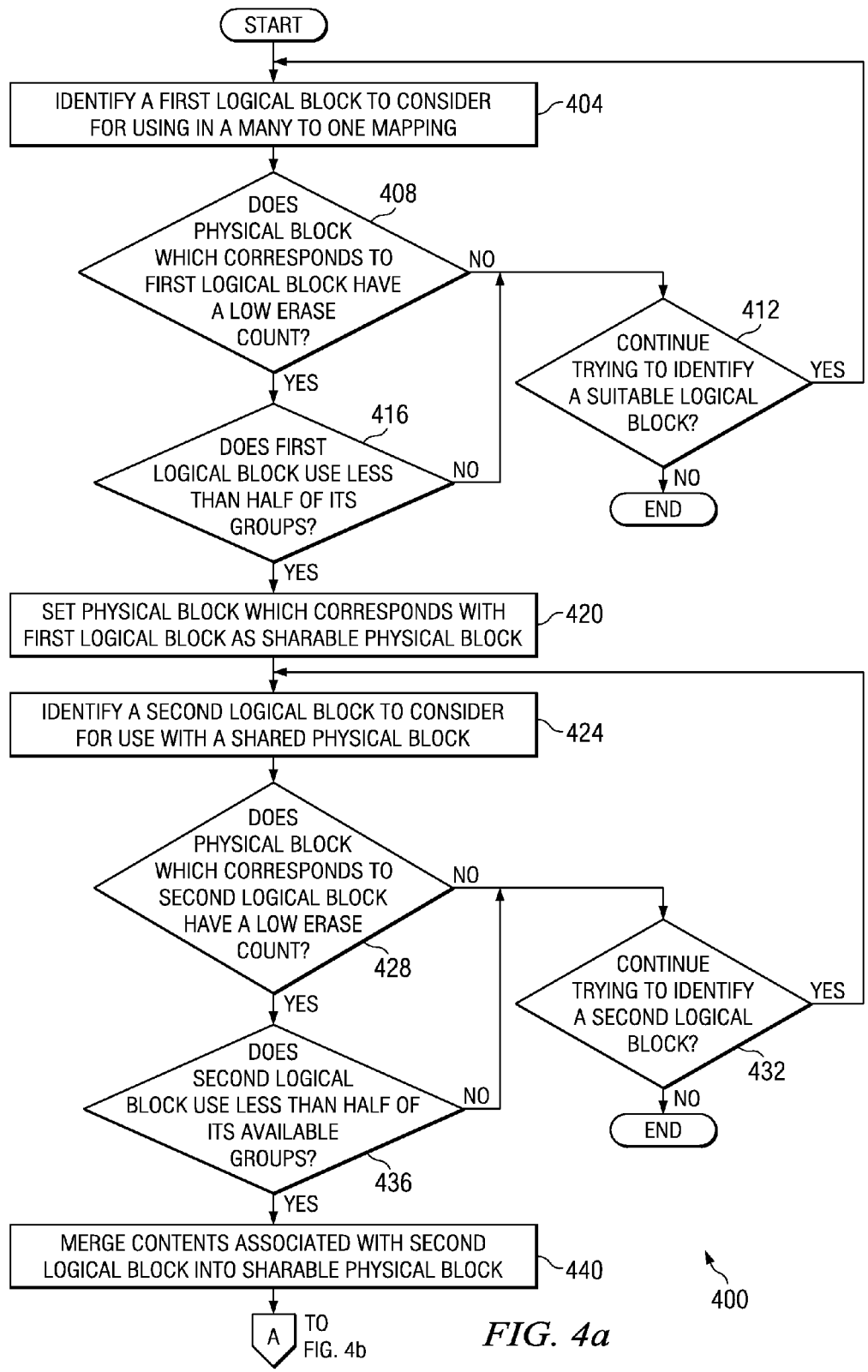
FIGS. 4a and 4b are a process flow diagram which illustrates one method of mapping a plurality of logical blocks to a single physical block in accordance with an embodiment of the present invention.
Figure 4B:
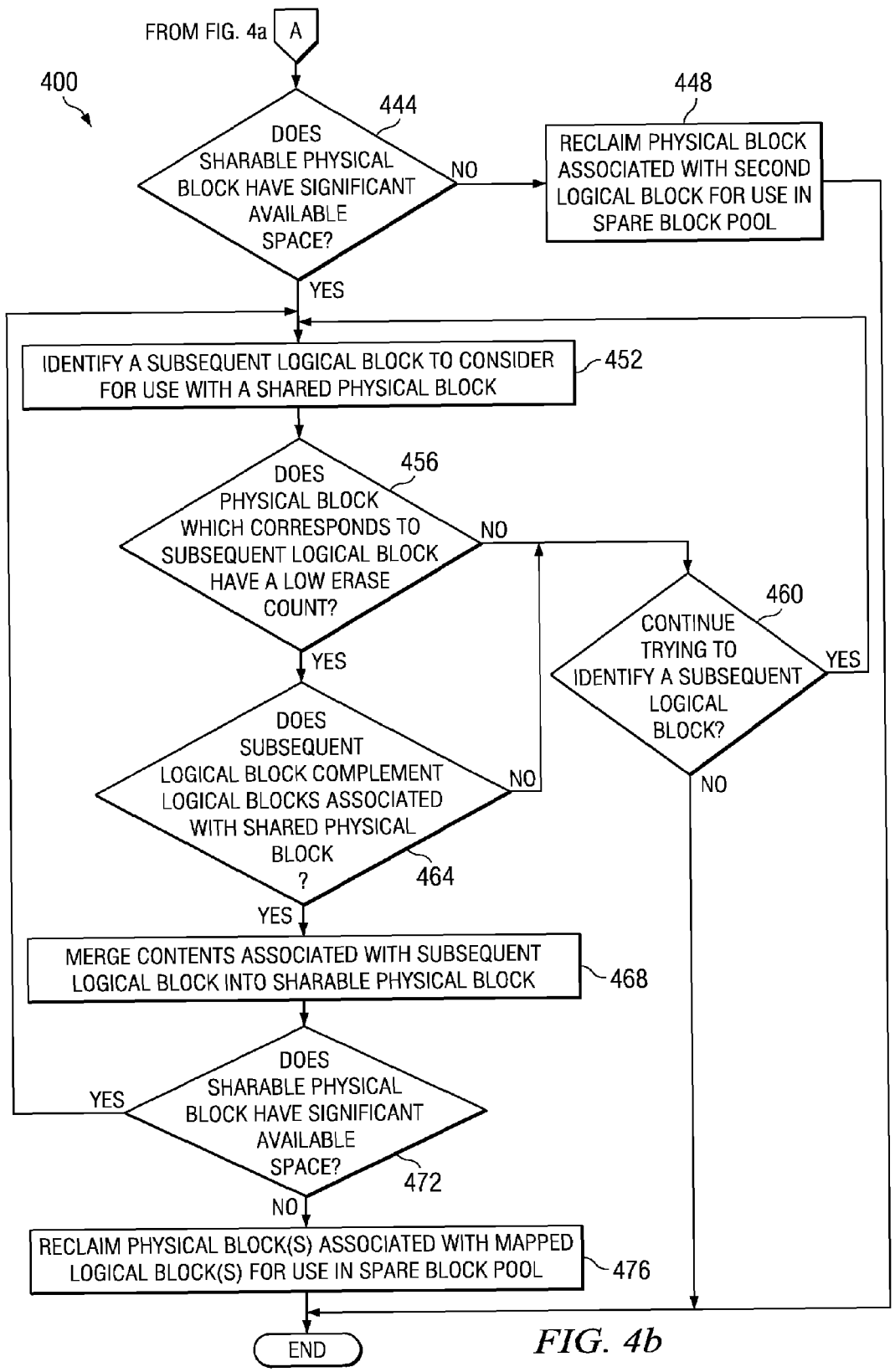

FIGS. 4a and 4b are a process flow diagram which illustrates one method of mapping a plurality of logical blocks to a single physical block in accordance with an embodiment of the present invention. A many-to-one mapping of logical to physical blocks may occur as a part of a hybrid mapping implementation, although a many-to-one mapping of logical to physical blocks may occur within a system which does not use a hybrid mapping implementation as discussed above. A process 400 of mapping more than one logical block to a single physical block begins at step 404 in which a first logical block which is to be considered for use in a many-to-one mapping of logical to physical blocks is identified. Once a first logical block is identified, it is determined in step 408 whether the physical block which corresponds to the first logical block has a low erase count. In other words, it is determined whether the physical block to which the first logical block is mapped is considered to be rarely erased. The erase count associated with the physical block may be identified, in one embodiment, from an erase count block which stores information including, but not limited to, erase counts of substantially all physical blocks within a system. It should be appreciated that the threshold below which an erase count is considered to be a low erase count may vary widely, and may depend on factors which include, but are not limited to, the requirements of a particular system.

If it is determined in step 408 that the physical block which corresponds to the first logical block does not have a low erase count, then the indication is that the first logical block is not suitable for use in a many-to-one logical to physical block mapping. When a physical block associated with a logical block has a relatively high erase count, then the contents associated with the logical block are written and stored relatively often, which may reduce the efficiency and effectiveness of a many-to-one mapping when the logical block is a part of such a mapping. Accordingly, when the first logical block is determined to be unsuitable for use in a many-to-one logical to physical block mapping, process flow moves to step 412 in which a determination is made as to whether to continue to attempt to identify a suitable logical block. When it is determined that no more attempts are to be made to identify a suitable logical block, then the process of mapping more than one logical block to a single physical block is completed. On the other hand, if it is determined that additional attempts are to be made to identify a suitable logical block, process flow returns from step 412 to step 404 in which a new first logical block to consider for use is identified.

Returning to step 408, if it is determined that the physical block associated with the first logical block has a low erase count, then it is determined in step 416 whether the first logical block uses no more than half, or less than or approximately half, of its available groups. That is, it is determined whether no more than half of the groups in the first logical block effectively contain data. When it is determined that the first logical block uses more than half of its groups, then the indication is that the first logical block is not suitable for use in a many-to-one logical to physical block mapping. As such, process flow moves from step 416 to step 412 in which it is determined whether to continue to attempt to identify a suitable logical block.

Alternatively, if it is determined in step 416 that the first logical block uses no more than half of its available groups, then in step 420, the physical block which corresponds with the first logical block is set as a sharable physical block. Once the sharable physical block is set, a second logical block which is to be considered for use with the first logical block in a many-to-one logical to physical block mapping is identified in step 424.

After the second logical block is identified, it is determined in step 428 whether the physical block which corresponds to the second logical block has a low erase count. If it is determined in step 428 that the physical block which corresponds to the second logical block does not have a low erase count, then the indication is that the second logical block does not complement the first logical block, i.e., is not suitable for use in a many-to-one logical to physical block mapping. As such, process flow moves to step 432 in which a determination is made as to whether to continue to attempt to identify another suitable second logical block. When it is determined that no more attempts are to be made to identify a suitable second logical block, then the process of mapping more than one logical block to a single physical block is terminated. Alternatively, if it is determined that additional attempts are to be made to identify a suitable logical block, process flow returns from step 432 to step 424 in which a new second logical block to consider for use is identified.

Referring back to step 428, if it is determined that the physical block which corresponds to the second logical block has a low erase count, then it is determined in step 436 if the second logical block uses no more than half of its available groups. That is, it is determined in step 436 whether fewer than approximately half of the groups associated with the second logical block have associated data. If it is determined that more than half of the groups in the logical block have associated data, then the second logical block is not used in a many-to-one logical to physical block mapping, and process flow returns to step 432 in which it is determined whether to continue to try to identify a second logical block.

If, however, it is determined in step 436 that the second logical block uses less than approximately half of its available groups, then the second logical block may be used in a many-to-one logical to physical block mapping. Accordingly, in one embodiment, the contents associated with the second logical block are merged into the sharable physical block in step 440.

Once the contents associated with the first and second logical blocks are written or otherwise stored into the sharable physical block, it is determined in step 444 whether the sharable physical block has significant available space. Such a determination may include a determination of whether the amount of available space, e.g., the number of groups available, is such that it may be possible for another logical block to share the sharable physical block. It should be understood that the amount of available space which is considered to be sufficient to merit mapping another logical block to the sharable physical block may vary widely.

When it is determined that the sharable physical block does not have significant available space, then in step 476, the physical block associated with the second logical block is reclaimed for use in the spare block pool, and the process of mapping more than one logical block to a single physical block is completed. Alternatively, if it is determined that the sharable physical block has significant available space, then a subsequent logical block which is to be considered for use with the shared physical block is identified in step 452. Once a subsequent logical block is identified, it is determined in step 456 whether the physical block which corresponds to the subsequent logical block has a low erase count.

If it is determined in step 456 that the physical block which corresponds to the subsequent logical block does not have a low erase count, then the indication is that the subsequent logical block is not suitable for mapping to the shared physical block. Accordingly, process flow moves to step 460 in which it is determined if continuing attempts are to be made to identify a suitable subsequent logical block. When it is determined that no more attempts are to be made to identify a suitable subsequent logical block, then the process of mapping more than one logical block to a single physical block is completed. However, if it is determined that additional attempts are to be made to identify a suitable logical block in step 460, process flow returns to step 452 in which a new first logical block to consider for use is identified.

Returning to step 456, if it is determined that the subsequent logical block has a low erase count, a determination is made in step 464 regarding whether the subsequent logical block complements the logical blocks already associated with the shared physical block. In other words, it is determined if the number of groups in the subsequent logical block which have associated data is less than or approximately equal to the number of groups in the shared physical block which are available for use. If it is determined that the subsequent logical block does not complement the logical blocks associated with the shared physical block, then it is determined in step 460 whether or not to try to identify a different subsequent logical block.

Alternatively, if it is determined in step 464 that the subsequent logical block complements the logical blocks associated with the shared physical block, then the contents or data associated with the subsequent logical block are merged into the sharable physical block in step 468. Once the contents are merged, it is determined in step 472 whether the sharable physical block has significant available space for another logical block to be mapped to the sharable physical block. When it is determined that the sharable physical block has significant available space, process flow moves to step 452 in which another subsequent logical block to consider for use with a shared physical block is identified. On the other hand, if the determination is that the sharable physical block does not have significant available space, then any newly unused physical blocks associated with any newly mapped logical blocks, including the physical block originally associated with the second logical block, are reclaimed for use in a spare block pool in step 476. Once any newly unused physical blocks are reclaimed, the process of mapping more than one logical block to a shared physical block is completed.

As previously mentioned, a many-to-one logical to physical block mapping may be performed when a spare block pool within a system has run low, and there is a need to obtain physical blocks for the spare block pool. During a block reclamation process, logical blocks which each have an associated physical block may effectively be processed to reclaim physical blocks by allowing complementary sets of logical blocks to share physical blocks.

Figure 5:
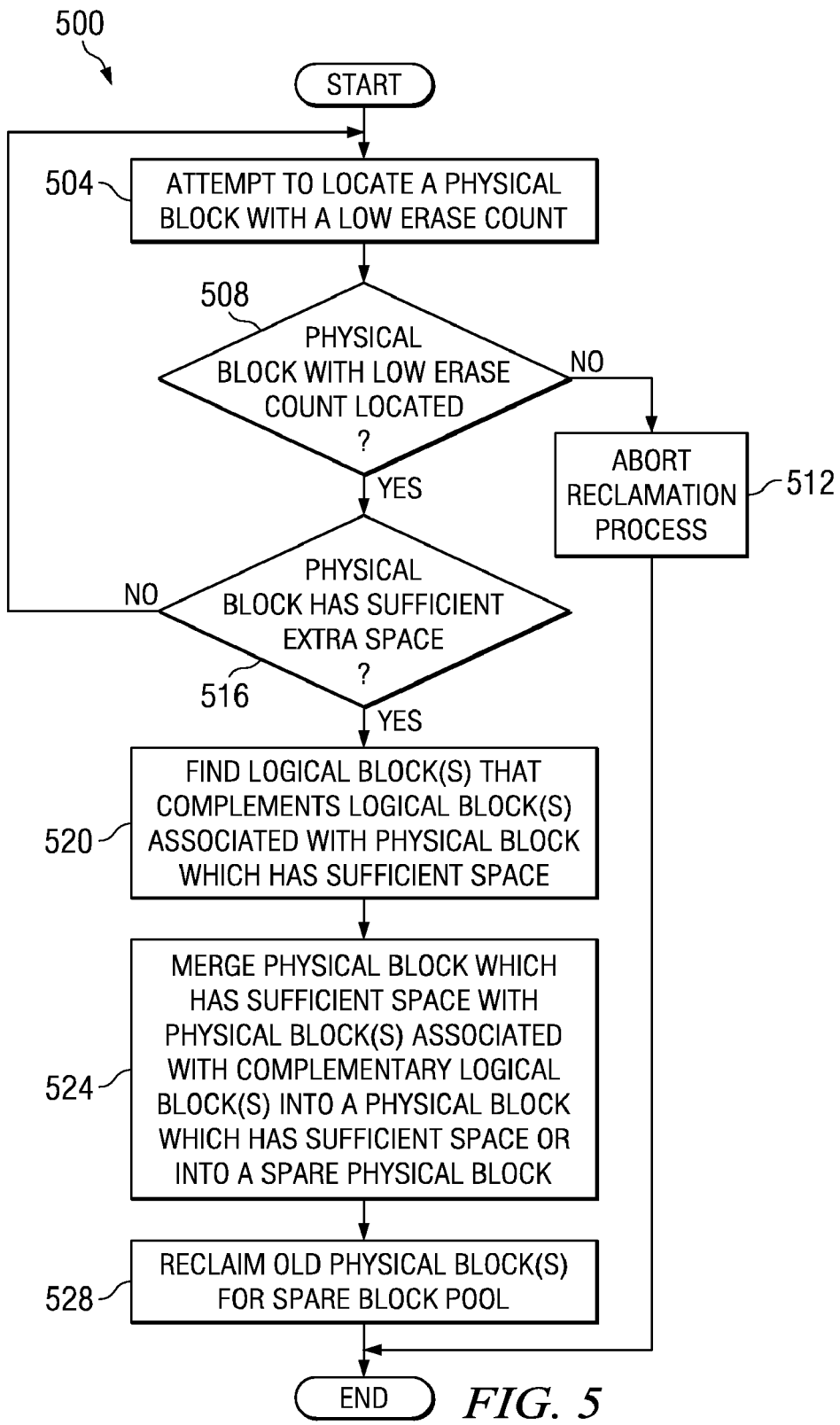
FIG. 5 is a process flow diagram which illustrates one method of reclaiming at least one physical block by performing a many to one mapping of logical to physical blocks in accordance with an embodiment of the present invention.

With reference to FIG. 5, the steps associated with one block reclamation process which has the capability of mapping a plurality of logical blocks to one physical block will be described in accordance with an embodiment of the present invention. A process 500 of reclaiming physical blocks by enabling some physical blocks to be shared begins at step 504 in which an attempt is made to locate a physical block which has a low erase count. As previously mentioned, a low erase count may be substantially any erase count which has a value that is less than a threshold value. A determination is then made in step 508 as to whether a physical block with a low erase count has been located.

If it is determined in step 508 that a physical block with a low erase count has not been located, the indication is that there are no physical blocks which are suitable for use in a many-to-one logical to physical block mapping. As such, in step 512, a block reclamation process is aborted. Alternatively, if the determination in step 508 is that a physical block with a low erase count has been located, process flow proceeds to step 516 in which it is determined if that physical block has sufficient extra, or unused, space. It should be appreciated that the amount of extra space which is considered to be sufficient may vary depending upon the requirements of a particular system, or the configuration of a particular system. By way of example, in one embodiment, when a physical block is less than half used, the amount of extra space remaining in the physical block may be considered to be sufficient. However, in another embodiment, when there is extra space remaining in the physical block which approximately corresponds to the size of a group within the physical block, the amount of extra space in the physical block may be considered to be sufficient.

When the determination in step 516 is that the physical block does not have sufficient extra space, the implication is that the physical block does not include enough unused space to be shared by more than one logical block. Accordingly, process flow returns to step 504 in which another attempt is made to locate a physical block with a low erase count. Alternatively, if it is determined in step 516 that the physical block has sufficient extra space, then in step 520, a logical block which complements the logical block or the plurality of logical blocks associated with the physical block is located. That is, a logical block which is suitable for sharing the physical block with sufficient extra space is found. In one embodiment, more than one logical block may share the physical block.

Once a complementary logical block is found, or complementary logical blocks are found, then the contents associated with the complementary logical block or blocks may be merged into the physical block with sufficient extra space in step 524. It should be understood, however, that rather than merging the contents associated with the complementary logical block or blocks into the physical block with sufficient extra space, the contents of the physical block with sufficient extra space may be merged along with the contents of the complementary logical block or blocks into a spare physical block.

After the contents associated with the complementary logical block or blocks are merged with contents of the physical block with sufficient space, e.g., either into the physical block with sufficient space or into a spare physical block, any old physical blocks are reclaimed in step 528. Physical blocks which may be reclaimed include a physical block that was associated with the complementary logical block and, in the event that contents of the physical block with sufficient extra space were merged into a spare physical block in step 524, the physical block which was identified as having sufficient extra space. Reclaimed physical blocks are generally placed in a spare block pool. Once any old physical blocks are reclaimed, the process of reclaiming old physical blocks be enabling some physical blocks to be shared is completed.

Figure 6:
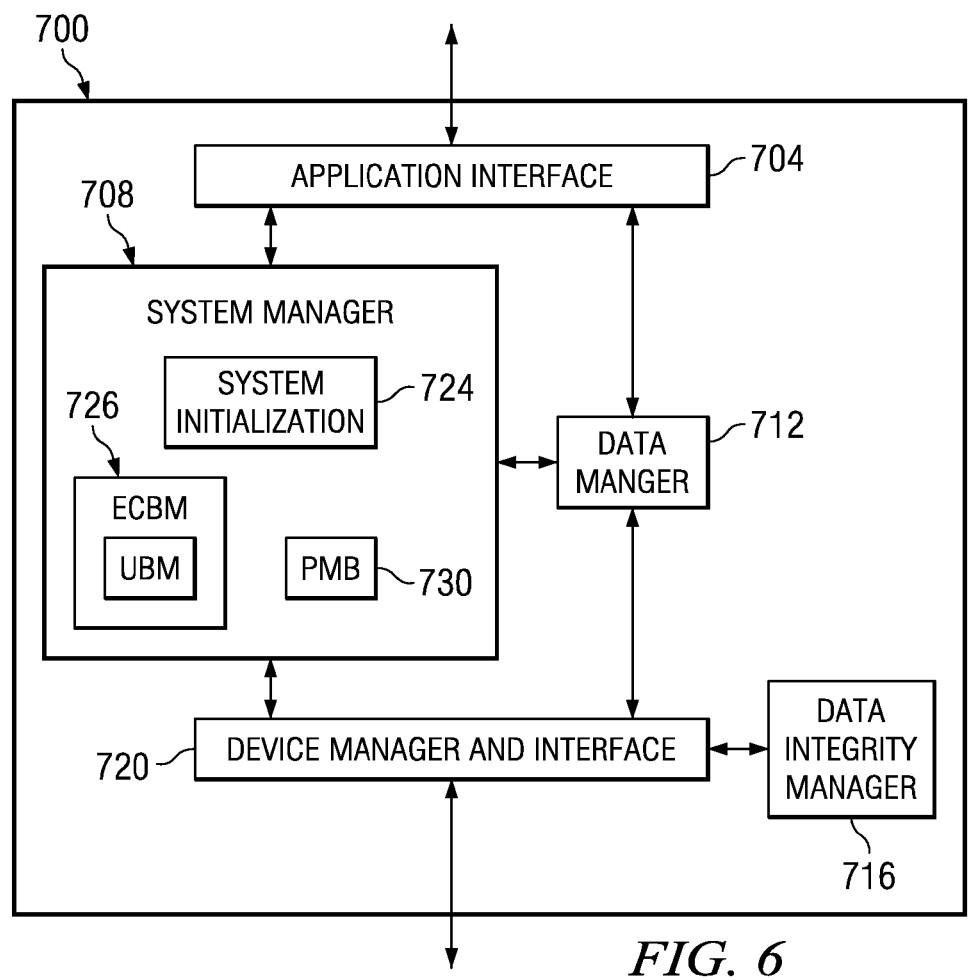
FIG. 6 is a diagrammatic block diagram representation of a system architecture in accordance with an embodiment of the present invention.

In general, the functionality associated with implementing, maintaining, and utilizing a hybrid mapping scheme or, more generally, a mapping scheme which allows for a many-to-one mapping between logical and physical blocks, is provided in software, e.g., as program code devices, or as firmware to a host system which includes a non-volatile memory or non-volatile memory component. One embodiment of a suitable system architecture associated with the software or firmware provided to a host system to enable a hybrid mapping scheme to be implemented, maintained, and used is shown in FIG. 6. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 1a.

In general, application interface module 704 may be arranged to communicate with the host, operating system or the user directly. Application interface module 704 is also in communication with system manager module 708 and data manager module 712. When the user want to read, write or format the flash memory, it send requests to the operating system, the requests are passed to the Application interface. The Application interface directs the requests to the system manager module 708 or data manager module 712 depending on the requests.

System manager module 708 includes a system initialization submodule 724, an erase count block management submodule 726, and a power management block submodule 730. System initialization submodule 724 is generally arranged to enable an initialization request to be processed, and typically communicates with erase count block management submodule 726. Erase count block management submodule 726 includes functionality to cause erase counts of blocks to be stored, and functionality to cause an average erase count to be calculated, as well as updated, using individual erase counts. The use of erase counts is described in co-pending U.S. patent application Ser. No. 10/281,739, which has been incorporated by reference in its entirety. System initialization module 724 is also arranged to resolve a one-to-many logical-to-physical block assignment and, hence, may utilize update indexes. Power management block submodule 730 may be arranged to enable a power management to be implemented, maintained, and used. By way of example, power management block submodule 730 may be arranged to allocate power management blocks, and to oversee the writing of signatures and other information which may be stored in a power management block.

In addition to being in communication with application interface module 704, system manager module 708 is also in communication with data manager module 712, as well as device manager and interface module 720. Data manager module 712, which communicates with both system manager module 708 and application interface module 704, may include functionality to provide sector mapping which effectively translates logical sectors into physical sectors. That is, data manager module 712 is arranged to map logical blocks into physical blocks. Data manager module 712 may also include functionality associated with operating system and file system interface layers, and enables groups within blocks to be managed, as described in co-pending U.S. patent application Ser. No. 10/281,855, which has been incorporated by reference in its entirety.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

Although only a few embodiments of the present invention have been described, it should be understood that the present invention may be embodied in many other specific forms without departing from the spirit or the scope of the present invention. By way of example, although a hybrid mapping implementation has generally been described as being associated with a NAND memory, e.g., an MLC NAND memory. In general, however, a hybrid mapping scheme may be implemented with respect to substantially any suitable memory or memory system.

While the functionality of mapping a plurality of logical blocks to a single physical block has been described as being included in a hybrid mapping implementation, the ability to map a plurality of logical blocks to a single physical block is not limited to being used as a part of a hybrid mapping implementation. For instance, a system may be arranged substantially only to support a many-to-one logical to physical block mapping scheme and a one-to-one logical to physical block mapping scheme, and not arranged to support a partial-to-one or one-to-many logical to physical block mapping scheme.

In general, a logical block has been described as being suitable for consideration as a logical block which may share a physical block when the logical block is such that it is considered to be less than approximately fifty percent full, e.g., no more than half of the groups in the logical block contain any data. That is, a threshold used to determine when a logical block may share a physical block is typically such that the logical block is not considered for use in a many-to-one mapping unless no more than half of the groups in the logical block contain data. It should be appreciated, however, that the threshold used to determine when a logical block may share a physical block may be widely varied. In one embodiment, a logical block in which more than fifty percent, e.g., approximately seventy-five percent, of the logical groups contain data may be mapped to a shared physical block along with another logical block in which less than fifty percent, e.g., approximately twenty-five percent, of the logical groups contain data without departing from the spirit or the scope of the present invention.

The use of a hybrid mapping scheme or, more generally, a mapping scheme which allows a many-to-one logical to physical block mapping has been described as being suitable for use within a system in which logical blocks are substantially divided into logical groups of pages and physical blocks are substantially divided into physical groups of pages. However, a many-to-one logical to physical block mapping may also be implemented within a system in which pages of a logical block and pages of a physical block are not divided into groups.

Further, when logical and physical blocks are effectively divided into groups, the number of groups included in each block may vary widely. In addition, the number of pages in each group may also vary. A group within a block generally includes more than a single page or a single sector, and less all pages associated with the block.

The steps associated with the various methods of the present invention may be widely varied. In general, steps may be added, removed, reordered, and altered without departing from the spirit or the scope of the present invention. For instance, when more than one logical block is to be mapped into a shared physical block, the contents of the logical blocks may be written into a physical block which was previously associated with one of the logical blocks. Alternatively, however, the contents of each of the logical blocks may instead be merged into a new physical block, e.g., a physical block obtained from a spare block pool. Additionally, although a logical blocks which are chosen to share a physical block have essentially been described as each previously having its own, single associated physical block, such logical blocks may each also previously have been associated with more than one physical block, i.e., at least some logical blocks may have been a part of a one-to-many logical to physical block mapping. Therefore, the present examples are to be considered as illustrative and not restrictive, and the invention is not to be limited to the details given herein, but may be modified within the scope of the appended claims.

What is claimed is:

1. A method for mapping logical blocks with physical blocks in a non-volatile memory system, wherein a plurality of the logical blocks in the non-volatile memory system each include a plurality of logical pages organized into at least two logical block groups, the method comprising:

determining whether a first physical block in the non-volatile memory system is logically associated with one or more logical block groups of a first logical block in the non-volatile memory system;

determining whether it is appropriate to logically map one or more logical block groups of a second logical block in the non-volatile memory system to the first physical block responsive to determining that the first physical block is logically associated with the one or more logical block groups of the first logical block; and logically mapping the one or more logical block groups of the second logical block to the first physical block responsive to determining that it is appropriate to map the one or more logical block groups of the second logical block to the first physical block; and wherein the one or more logical block groups of the first logical block and the one or more logical block groups of the second logical block are concurrently mapped to the first physical block.

2. The method of claim 1, further comprising:

logically mapping the one or more logical block groups of the second logical block to the first physical block responsive to determining that the first physical block is not logically associated with the one or more logical block groups of the first logical block.

3. The method of claim 2 further comprising:

determining whether it is appropriate to logically map one or more logical block groups of a third logical block to the first physical block; and logically mapping the one or more logical block groups of the third logical block to the first physical block responsive to determining that it is appropriate to logically map the one or more logical block groups of the third logical block to the first physical block, wherein the one or more logical block groups of the second logical block and the one or more logical block groups of the third logical block are concurrently mapped to the first physical block.

4. The method of claim 2 wherein logically mapping the one or more logical block groups of the second logical block to the first physical block includes storing contents associated with the second logical block into the first physical block.

5. The method of claim 2 further comprising:

determining whether it is appropriate to logically map the one or more logical block groups of the second logical block to a second physical block; and logically mapping the one or more logical block groups of the second logical block to the second physical block responsive to determining that it is appropriate to logically map the one or more logical block groups of the second logical block to the second physical block.

6. The method of claim 1, wherein determining whether it is appropriate to logically map the one or more logical block groups of the second logical block to the first physical block is dependent on how many of the one or more logical block groups of the second logical block are logically associated with any physical blocks.

7. The method of claim 1, wherein determining whether it is appropriate to logically map the one or more logical block groups of the second logical block to the first physical block comprises determining a number of the one or more logical block groups of the second logical block that are logically associated with any physical blocks.

8. The method of claim 7, wherein determining whether it is appropriate to logically map the one or more logical block groups of the second logical block to the first physical block further comprises comparing the number of the one or more logical block groups of the second logical block that are logically associated with any physical blocks with a predetermined number.

9. The method of claim 8, wherein it is determined that it is appropriate to logically map the one or more logical block groups of the second logical block to the first physical block based on the comparison of the number of the one or more logical block groups of the second logical block that are logically associated with any physical blocks with the predetermined number.

10. A non-volatile memory system comprising:

a non-volatile memory, the non-volatile memory including a plurality of physical blocks, and a plurality of logical blocks each having a plurality of pages organized into at least two logical block groups;

means for determining whether a first physical block is logically associated with one or more logical block groups of a first logical block;

means for determining whether it is appropriate to logically map one or more logical block groups of a second logical block to the first physical block responsive to determining that the first physical block is logically associated with the one or more logical block groups of the first logical block; and means for logically mapping the one or more of the logical block groups of the second logical block to the first physical block responsive to determining that it is appropriate to logically map the one or more logical block groups of the second logical block to the first physical block, wherein the one or more logical block groups of the first logical block and the one or more logical block groups of the second logical block are concurrently mapped to the first physical block.

11. The non-volatile memory system of claim 10 wherein the non-volatile memory system further comprises:

means for logically mapping the one or more of the logical block groups of the second logical block to the first physical block responsive to determining that the first physical block is not logically associated with the logical block groups of the first logical block.

12. The non-volatile memory system of claim 11 wherein the means for logically mapping the one or more logical block groups of the first logical block to a second physical block include means for storing contents associated with the second logical block into the first physical block.

13. The non-volatile memory system of claim 11 further comprising:

means for determining whether it is appropriate to logically map the one or more logical block groups of the second logical block to a second physical block; and means for logically mapping the one or more logical block groups of the second logical block to the second physical block responsive to determining that it is appropriate to logically map the one or more logical block groups of the second logical block to the second physical block.

14. The non-volatile memory system of 10 further comprising:

means for determining whether it is appropriate to logically map one or more logical block groups of a third logical block to the first physical block; and means for logically mapping the one or more logical block groups of the third logical block to the first physical block responsive to determining that it is appropriate to logically map the one or more logical block groups of the third logical block to the first physical block, wherein the one or more logical block groups of the first logical block the one or more logical block groups of the second logical block, and the one or more logical block groups of the third logical block are concurrently mapped to the first physical block.

15. The non-volatile memory system of claim 10 wherein the non-volatile memory system is one of an embedded system, a Smart Media card, a Compact Flash card, a Secure Digital Card, and a MultiMedia card.

16. The non-volatile memory system of claim 10 means for determining whether it is appropriate to logically map one or more logical block groups of the second logical block to the first physical block include means for determining how many of the one or more logical block groups of the second logical block are logically associated with any physical blocks.

17. A memory system comprising:
a non-volatile memory, the non-volatile memory having a plurality of physical blocks, the non-volatile memory further having a plurality of logical blocks each having a plurality of logical pages organized into at least two logical block groups;
code devices operating to determine whether a first physical block is logically associated with one or more logical block groups of a first logical block;
code devices operating to determine whether it is appropriate to logically map one or more logical block groups of a second logical block to the first physical block responsive to determining that the first physical block is logically associated with the one or more logical block groups of the first logical block;
code devices operating to logically map the one or more logical block groups of the second logical block to the first physical block responsive to determining that it is appropriate to logically map the one or more logical block groups of the second logical block to the first physical block; and
a memory area that stores at least a portion of the code devices for execution by a controller;
wherein the code devices cooperate so that the one or more logical block groups of the first logical block and the one or more logical block groups of the second logical block may be concurrently mapped to the first physical block.

18. The memory system of claim 17 wherein the memory system further comprises:
code devices operating to logically map the one or more logical block groups of the second logical block to the first physical block responsive to determining that the first physical block is not logically associated with the one or more logical block groups of the first logical block.

19. The memory system of claim 18 further comprising:
code devices operating to determine whether it is appropriate to logically map one or more logical block groups of a third logical block to the first physical block; and
code devices operating to logically map the one or more logical block groups of the third logical block to the first physical block responsive to determining that it is appropriate to logically map the one or more logical block groups of the third logical block to the first physical block, wherein the one or more logical block groups of the second logical block and the one or more block groups of the third logical block are concurrently mapped to the first physical block.

20. The memory system of claim 17 further including:
code devices operating to determine whether it is appropriate to logically map one or more logical block groups of the second logical block to a second physical block; and
code devices operating to logically map the one or more logical block groups of the second logical block to the second physical block responsive to determining that it is appropriate to logically map the one or more logical block groups of the second logical block to the second physical block.

21. The memory system of claim 17 wherein the non-volatile memory system is one of an embedded system, a Smart Media card, a Compact Flash card, a Secure Digital Card, and a Multimedia card.

22. The memory system of claim 17 wherein code devices operating to determine whether it is appropriate to logically map one or more logical block groups of the second logical block to the first physical block is dependent on how many of the one or more logical block groups of the second logical block are logically associated with any physical blocks.

* * * * *